United States Patent
Skroski et al.

(10) Patent No.: US 11,489,229 B1
(45) Date of Patent: Nov. 1, 2022

(54) SYSTEM FOR ELECTRIC AIRCRAFT BATTERY VENTING USING A VENT CONDUIT

(71) Applicant: BETA AIR, LLC, South Burlington, VT (US)

(72) Inventors: Tyler John Skroski, South Burlington, VT (US); Stuart Denson Schreiber, Essex, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/563,331

(22) Filed: Dec. 28, 2021

(51) Int. Cl.
  *H01M 50/367* (2021.01)
  *H01M 50/342* (2021.01)
  *H01M 10/653* (2014.01)
  *H01M 10/613* (2014.01)

(52) U.S. Cl.
  CPC ....... *H01M 50/367* (2021.01); *H01M 10/613* (2015.04); *H01M 10/653* (2015.04); *H01M 50/3425* (2021.01); *H01M 2220/20* (2013.01)

(58) Field of Classification Search
  CPC ............. H01M 50/367; H01M 10/613; H01M 10/653; H01M 50/3425; H01M 2220/20
  See application file for complete search history.

(56) References Cited

U.S. PATENT DOCUMENTS

| | | | |
|---|---|---|---|
| 2,727,524 A | 12/1955 | Gill | |
| 4,207,387 A * | 6/1980 | Jutte | H01M 50/35 429/88 |
| 5,683,830 A * | 11/1997 | Fritts | H01M 50/394 429/84 |
| 9,147,917 B2 * | 9/2015 | Oh | H01M 10/6563 |
| 9,614,210 B2 | 4/2017 | Dekeuster et al. | |
| 9,660,237 B2 | 5/2017 | Dekeuster et al. | |
| 9,663,233 B2 | 5/2017 | Plessner et al. | |
| 9,806,310 B1 | 10/2017 | Pounds | |

(Continued)

FOREIGN PATENT DOCUMENTS

| | | | | |
|---|---|---|---|---|
| CN | 112103443 A | * | 12/2020 | .......... H01M 10/613 |
| FR | 3085546 A1 | | 3/2020 | |

OTHER PUBLICATIONS

Mohd Tariq, et al., Aircraft batteries: current trend towards more electric aircraft, Jun. 1, 2017.

(Continued)

*Primary Examiner* — Milton I Cano
*Assistant Examiner* — Mary G Henshaw
(74) *Attorney, Agent, or Firm* — Caldwell Intellectual Property Law

(57) ABSTRACT

A battery venting system having a battery module containing a plurality of pouch cells. The battery module also includes a vent port. The battery venting system also including a vent outlet disposed on the surface of an aircraft fuselage. The battery venting system further including a vent conduit fluidly connecting the vent port of the battery module to the vent outlet. The vent conduit is configured to carry battery ejecta from the battery module, from the vent port to the vent outlet. The vent conduit includes at least a cooling fin disposed on an interior wall of the vent conduit and extending into the vent conduit, the at least a cooling fin configured to dissipate heat from the battery ejecta, when the battery ejecta is in the vent conduit.

17 Claims, 6 Drawing Sheets

(56) References Cited

U.S. PATENT DOCUMENTS

| | | |
|---|---|---|
| 10,859,193 B2 | 12/2020 | Harmuth et al. |
| 2013/0157100 A1* | 6/2013 | Heise .................. H01M 10/647 |
| | | 429/120 |
| 2015/0325827 A1 | 11/2015 | Dittmar et al. |
| 2016/0141572 A1 | 5/2016 | Nakayama |
| 2019/0173074 A1* | 6/2019 | Ogawa .............. H01M 10/6551 |
| 2021/0005857 A1 | 1/2021 | Juds et al. |
| 2021/0036301 A1 | 2/2021 | Dekeuster et al. |

OTHER PUBLICATIONS

Green Car Congress, Boeing details improvements to Li-ion battery system for 787; more than 200,000 engineering hours applied so far, Mar. 15, 2013.

* cited by examiner

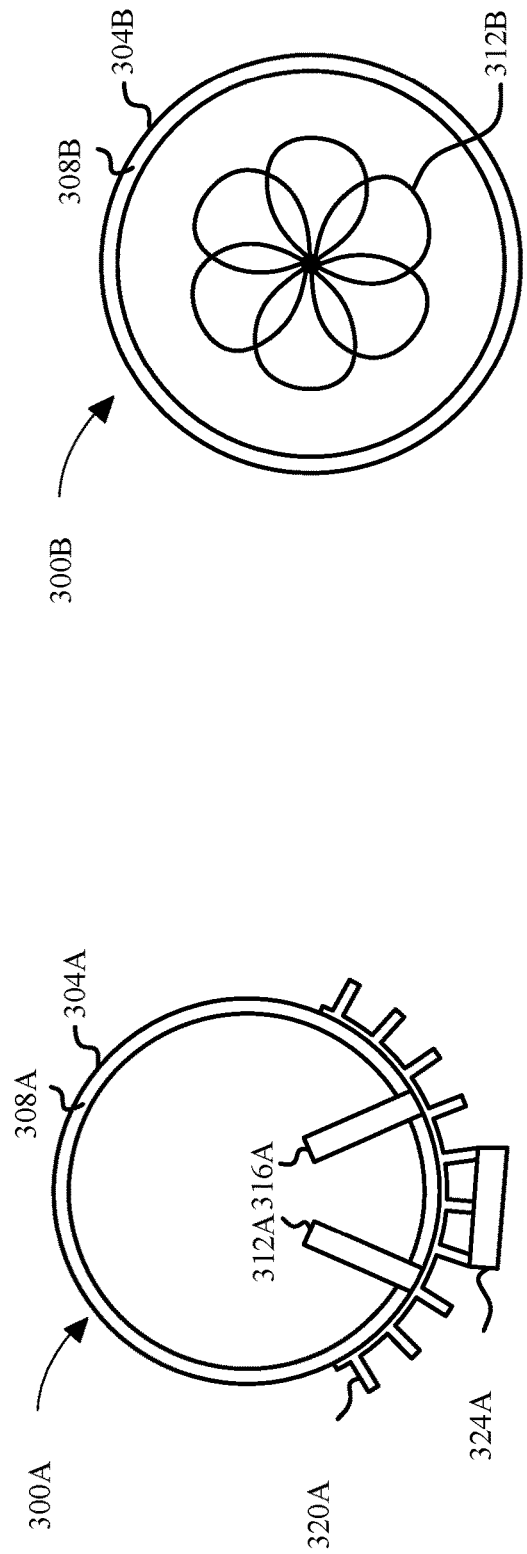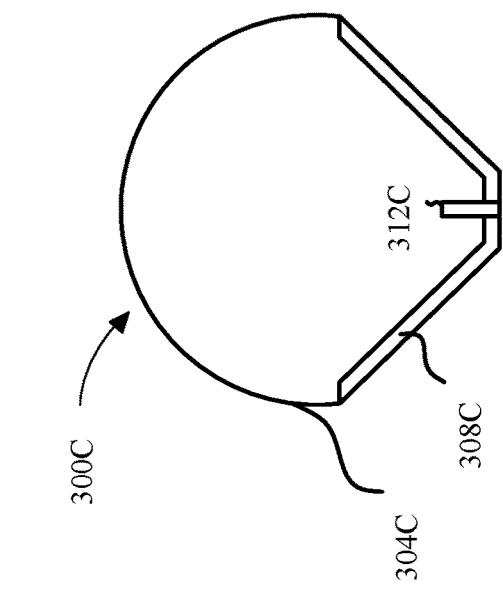

SYSTEM FOR ELECTRIC AIRCRAFT BATTERY VENTING USING A VENT CONDUIT

FIELD OF THE INVENTION

The present invention generally relates to the field of battery venting. In particular, the present invention is directed to a system for aircraft battery venting using a vent conduit.

BACKGROUND

In some cases, batteries may experience thermal runaway. When batteries experience thermal runaway, it is important to vent battery ejecta from the battery module, in order to prevent the thermal runaway from propagating cell to cell. Thermal runaway presents a particular problem in electric aircraft, where the functioning and health of the aircraft's batteries is of the utmost importance. Thus, it is important to have a way to effectively vent battery ejecta from an aircraft should the batteries experience thermal runaway. The existing solutions to this problem are not sufficient.

SUMMARY OF THE DISCLOSURE

In an aspect, a battery venting system, including a battery module, the battery module containing a plurality of pouch cells, the battery module comprising a vent port. The battery venting system further including a vent outlet, the vent outlet disposed on the surface of an aircraft fuselage. Additionally, the battery module including a vent conduit, the vent outlet the vent conduit fluidly connecting the vent port of the battery module to the vent outlet. The vent conduit is configured to carry battery ejecta from the battery module, from the vent port to the vent outlet the vent conduit including at least a cooling fin, the at least a cooling fin disposed on an interior wall of the vent conduit and extending into the vent conduit, the at least a cooling fin configured to dissipate heat from the battery ejecta, when the battery ejecta is in vent conduit.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3A is an illustration of a vent conduit cross section having multiple cooling fins;

FIG. 3B is an illustration of a vent conduit cross section having a turbulator;

FIG. 3C is an illustration of a vent conduit cross section having a trapezoidal bottom;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for venting battery ejecta. Particularly, aspects of the present disclosure are related to venting battery ejecta from an aircraft.

Aspects of the present disclosure can be used to cool the battery ejecta while it is in a vent conduit. This is so because the vent conduit includes cooling fins. Aspects of the present disclosure can also be used to ablate battery ejecta while it is in a vent conduit. This is so, at least in part, the vent conduit may include an ablative layer made from an ablative material.

Aspects of the present disclosure allow for enhanced cooling methods using a heat sink. In certain embodiments, the heat sink may be accompanied by a cooling fan in order to further enhance the cooling.

Figure 1:
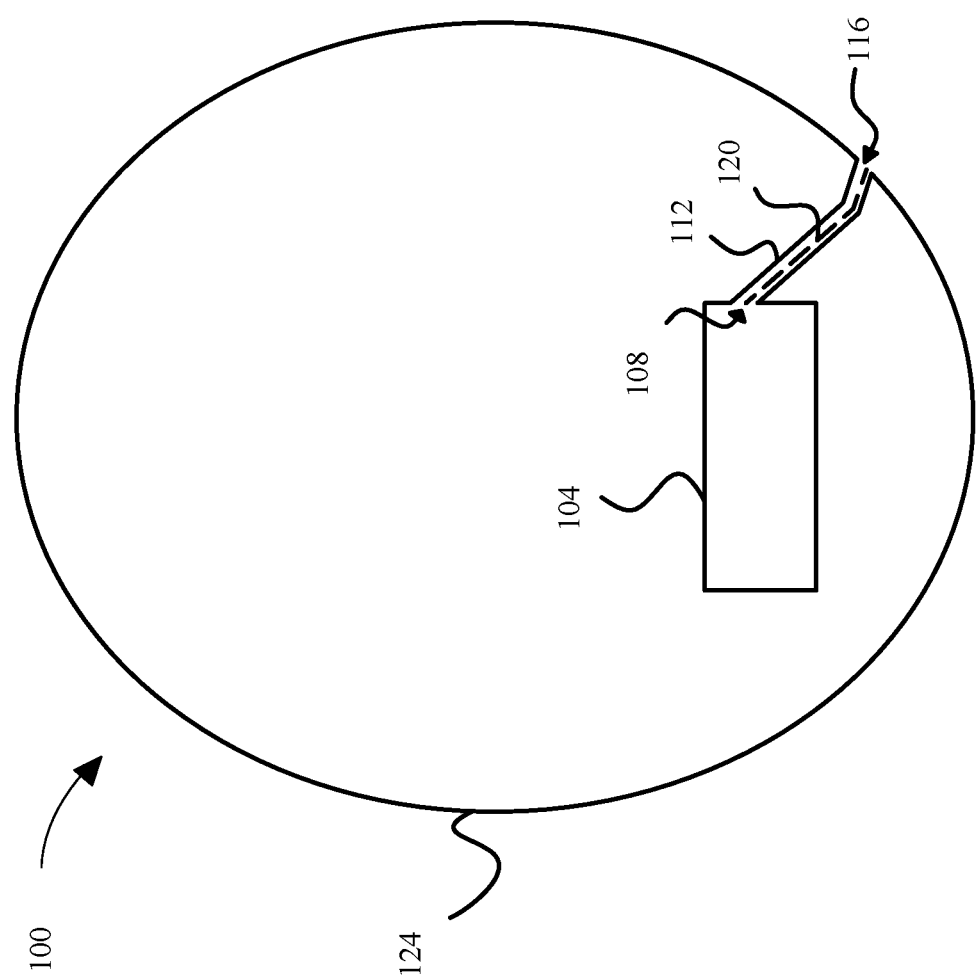
FIG. 1 is a diagram of a battery venting system disposed within an aircraft fuselage.

Referring now to the drawings, FIG. 1 illustrates an embodiment of battery venting system 100. Battery venting system comprises a battery module 104. A "battery module" contains plurality of battery cells that have been wired together in series, parallel, or a combination of series and parallel, wherein the "battery module" holds the battery cells in a fixed position. Battery module 104 may be consistent with any battery module disclosed in U.S. application Ser. No. 17/404,500, filed on Aug. 17, 2021, and entitled "STACK BATTERY PACK FOR ELECTRIC VERTICAL TAKE-OFF AND LANDING AIRCRAFT," or U.S. application Ser. No. 17/475,743, filed on Sep. 15, 2021, and entitled "BATTERY SYSTEM AND METHOD OF AN ELECTRIC AIRCRAFT WITH SPRING CONDUCTORS," the entirety of both applications is hereby incorporated by reference.

With continued reference to FIG. 1, battery module includes an electrochemical cell. For the purposes of this disclosure, an "electrochemical cell" is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. In some embodiments, battery module 104 may include cylindrical battery cells. For the purposes of this disclosure, cylindrical battery cells are round battery cells that have a larger height than diameter. In some embodiments, battery module 104 may include pouch cell. As used in this disclosure, "pouch cell" is any battery cell or module that includes a pocket. In some cases, a pouch cell may include or be referred to as a prismatic pouch cell, for example when an overall shape of pouch is prismatic. In some cases, a pouch cell may include a pouch which is substantially flexible.

Alternatively or additionally, in some cases, a pouch may be substantially rigid. In some cases, a pouch may include a polymer, such as without limitation polyethylene, acrylic, polyester, and the like. In some embodiments, a pouch may be coated with one or more coatings. For example, in some cases, a pouch may have an outer surface. In some embodiments, an outer surface may be coated with a metalizing coating, such as an aluminum or nickel containing coating. In some embodiments, a pouch coating may be configured to electrically ground and/or isolate pouch, increase pouch impermeability, increase pouches resistance to high temperatures, increases pouches thermal resistance (insulation), and the like. An electrolyte may be located in a pouch. In some embodiments, an electrolyte may include a liquid, a solid, a gel, a paste, and/or a polymer. In some embodiments, an electrolyte may include a lithium salt such as $LiPF_6$. In some embodiments, a lithium salt may include lithium hexafluorophosphate, lithium tetrafluoroborate, lithium perchlorate, or other lithium salts. In some embodiments, a lithium salt may include an organic solvent. In some embodiments, an organic solvent may include ethylene carbonate, dimethyl carbonate, diethyl carbonate or other organic solvents. In some embodiments, an electrolyte may wet or contact one or both of a pair of conductive tabs of a battery cell. A "conductive tab" as used in this disclosure is any protruding component capable of carrying a current.

With continued reference to FIG. 1, battery cells may include without limitation a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate ($LiFePO_4$), lithium cobalt oxide (LCO), lithium manganese oxide (LMO), a battery cell using lithium polymer technology, and/or metal-air batteries. Battery cells may include lead-based batteries such as without limitation lead acid batteries and lead carbon batteries. Battery cells may include lithium sulfur batteries, magnesium ion batteries, and/or sodium ion batteries. Battery cells may include solid state batteries or supercapacitors or another suitable energy source. Persons skilled in the art, upon reviewing the entirety of this disclosure, will be aware of various devices of components that may be used as a battery cell.

With continued reference to FIG. 1, battery module 104 may include a sensor. A sensor may be coupled to battery cells. In some embodiments, a sensor may be mechanically and/or electrically coupled to battery cells. A sensor may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery cells measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a system and/or a user to detect phenomenon is maintained and in a non-limiting example, a user alter aircraft usage pursuant to sensor readings.

With continued reference to FIG. 1, a sensor may include a humidity sensor. Humidity, as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A humidity sensor may include a psychrometer. A humidity sensor may include a hygrometer. A humidity sensor may be configured to act as or include a humidistat. A "humidistat", for the purposes of this disclosure, is a humidity-triggered switch, often used to control another electronic device. A humidity sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell. A sensor may include a multimeter. A multimeter may be configured to measure voltage across a component, electrical current through a component, and resistance of a component. A multimeter may include separate sensors to measure each of the previously disclosed electrical characteristics such as voltmeter, ammeter, and ohmmeter, respectively.

With continued reference to FIG. 1, a sensor may include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. A sensor and/or a control circuit incorporated therein and/or communicatively connected thereto may be configured to adjust charge to one or more battery cells as a function of a charge level and/or a detected parameter. For instance, and without limitation, a sensor may be configured to determine that a charge level of a battery cell is high based on a detected voltage level of that battery cell or portion of the battery pack. A sensor may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. A sensor may include digital sensors, analog sensors, or a combination thereof. A sensor may include digital-to-analog converters (DAC), analog-to-digital converters (ADC, A/D, A-to-D), a combination thereof.

With continued reference to FIG. 1, a sensor may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within a sensor, may be measured in Fahrenheit (° F.), Celsius (° C.), Kelvin (° K), or another scale alone or in combination. A temperature measured by sensors may comprise electrical signals which are transmitted to their appropriate destination wireless or through a wired connection.

With continued reference to FIG. 1, a sensor may include a sensor configured to detect gas that may be emitted during or after a catastrophic cell failure. "Catastrophic cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of catastrophic cell failure may include gaseous discharge including oxygen, hydrogen, carbon dioxide, methane, carbon monoxide, a combination thereof, or another undisclosed gas, alone or in combination. Further, a sensor may be configured to detect vent gas from electrochemical cells that may comprise a gas detector. For the purposes of this disclosure, a "gas detector" is a device used to detect a gas is present in an area. Gas detectors, and more specifically, the gas sensor that may be used in a sensor, may be configured to detect combustible, flammable, toxic, oxygen depleted, a combination thereof, or another type of gas alone or in combination. A gas sensor that may be present in a sensor may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. A sensor may include sensors that are configured to detect non-gaseous byproducts of catastrophic cell failure including, in non-limiting examples, liquid chemical leaks including aqueous alkaline solution, ionomer, molten phosphoric acid, liquid electrolytes with redox shuttle and ionomer, and salt water, among others. A sensor may include sensors that are configured to detect non-gaseous byproducts of catastrophic cell failure including, in non-limiting examples, electrical anomalies as detected by any of the previous disclosed sensors or components.

With continued reference to FIG. 1, battery module may include an insulation layer. In some embodiments, insulation layer may surround an individual battery cell, whereas, in other embodiments, insulation layer may surround multiple battery cells. As a non-limiting example, a single insulation layer may surround two battery cells. Insulation layer is a compliant insulation layer. For the purposes of this disclosure, "compliant" refers to a material that is able to deform elastically. For example, a material is capable of elastic deformation if it returns to its original size and shape after the force causing the deformation is removed. As a non-limiting example, insulation layer may include a foam. For the purposes of this disclosure, "foam" is a material that contains trapped pockets of gas. As another non-limiting example insulation layer may include a gel. In some embodiments, insulation layer may include a polymer. In yet another embodiment, insulation layer may include an aerogel. One of ordinary skill in the art would appreciate, after reviewing the entirety of this disclosure, that a variety of compliant materials would be suitable for use in insulation layer.

With continued reference to FIG. 1, battery module may include an ablative layer surrounding a battery cell. This ablative layer may be made out of an ablative material. For the purposes of this disclosure, "ablative material" may also include material that is ablated by ejecta. As a non-limiting example, ablative material may ablate when it comes into contact with ejecta from one of the pouch battery cells. Once an ablative material has been ablated, for the purposes of this disclosure, it may be considered to be in a "spent state." When the ablative layer is in its "spent state," it may become detached from a vent conduit and move, with the battery ejecta, along vent conduit and out of a vent outlet. In an embodiment, and without limitation, ablative material may be composed of one or more ablative materials. For example, ablative material may be composed of a first ablative material and a second ablative material. As a further non-limiting example, ablative material may comprise a plurality of resins, such as but not limited to a first, second, third, and/or fourth ablative material. For example, and without limitation, ablative material may include one or more resins capable of vaporizing, chipping, and/or eroding a battery ejecta. As a non-limiting example, ablative material may include one or more endothermic materials such as, but not limited to silicone materials, fire-resistance materials, organic rubber, organic resins, phenolic resins, silica dust, and the like thereof. Furthermore, as another non-limiting example, ablative material may include polymeric materials, silicone, carbon-based materials, high-melting point materials, and inorganic polymers. As a further non-limiting example, ablative material may include an epoxy novolac resin. As a further non-limiting example, ablative material may include a fiberglass material arranged in a honeycomb matrix. As a further non-limiting example, ablative material may include an epoxy phenol formaldehyde resin. As a further non-limiting example, ablative material may include a carbon and/or carbon composite resin. As a further non-limiting example, ablative material may include a carbon-carbon composite, carbon-phenolic composite, carbon-elastomeric composite, carbon-ceramic composite, and the like thereof. As a further non-limiting example, ablative material may include a phenolic resin, wherein the phenolic resin may be filled with a mesoporous silica particle which may be synthesized from a tetraethyl orthosilicate. In an embodiment, and without limitation, ablative material may include one or more materials comprising an attribute of a low thermal conductivity, high thermal resistance, high emissivity, good thermal stability, refractoriness, and the like thereof. In an embodiment, and without limitation, ablative material may be layered such that a first layer that is exposed to battery ejecta may interact with the battery ejecta to produce ablative residue, wherein a second layer may be exposed as a function of the production of the ablative reside. In an embodiment, and without limitation, the exposure of the second layer may occur iteratively. In some embodiments, the portion of the ablative material 212 that has entered a spent state may include carbonization, char, ash, flakes, dust, and the like.

With continued reference to FIG. 1, battery module 104 may include a bus element. For the purposes of this disclosure, a "bus element" is an electrically conductive pathway connecting at least a component in a system configured to convey electrical energy between components. Bus element may include one or more electrically conductive pathways configured to transfer electrical energy across the pathways to convey electrical energy from one component to one or more other components. Bus element may include a ring bus. Bus element may be implemented as disclosed in U.S. application Ser. No. 17/348,240, filed on Jun. 15, 2021, titled "System and Method for Dynamic Excitation of an Energy Storage Element Configured for Use in an Electric Aircraft," the entirety of which is hereby incorporated by reference. For the purpose of this disclosure, a "ring bus" is a bus element wherein circuit breakers are connected to form a ring with isolators on both sides of each circuit breaker. Ring bus may include a component configured to isolate a fault by tripping two circuit breakers while all other circuits remain in service; such a component may include a cross tie element as described in this disclosure.

With continued reference to FIG. 1, battery module 104 includes a vent port 108. As used in this disclosure a "vent port" is an opening and/or aperture configured to allow one or more gases, liquids, and/or solids to pass out of a confined space, such as a confined space containing and/or made up of a battery module. In an embodiment, vent port 108 may be configured to vent one or more cell ejecta from battery module 104. In an embodiment, and without limitation, vent port 108 may be configured to vent ablative residue from battery module 104. In some cases, vent port 108 may include a check valve. As used in this disclosure, a "check valve" is a valve that permits flow of a fluid only in certain, for example one, direction. In some cases check valve may be configured to allow flow of fluids substantially only away from battery module 104 while preventing back flow of vented fluid to battery module 104.

With continued reference to FIG. 1, check valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent port 108 may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring.

With continued reference to FIG. 1, vent port 108 is fluidly connected to a vent conduit 112. A "vent conduit," for the purposes of this disclosure, passage allowing ejecta and other material to exit from a device. For the purposes of this disclosure "fluidly connected" means that fluid is able to flow from one of the fluidly connected elements to the other, notwithstanding any elements that temporarily or optionally restrict fluid flow, such as, as non-limiting examples, a check valve or a pressure disk. Vent conduit is also fluidly connected to a vent outlet 116. For the purposes of this disclosure, a "vent outlet" is an opening through which material carried by a vent conduit can exit a device. Vent conduit 112 may have any cross-sectional shape configured to allow battery ejecta and other fluids to move from vent port 108 to vent outlet 116. The cross section of vent conduit 112 may be circular, rectangular, trapezoidal, elliptical, triangular, irregular, square, and the like. A person of ordinary skill in the art would, after reviewing the entirety of this disclosure, appreciate that a wide variety of cross-section shapes are possible.

With continued reference to FIG. 1, vent conduit 112 may be made of a material capable of withstanding the temperatures of the aircraft and/or battery module 104. As a non-limiting example, the vent conduit 112 may be made of a material that is capable of withstanding battery ejecta that may be produced by battery module 104. In some embodiments, vent conduit 112 may be made of a polymer. As a non-limiting example, vent conduit 112 may be made of carbon fiber. As another non-limiting example, vent conduit 112 may be made of a carbon fiber composite.

With continued reference to FIG. 1, vent conduit 112 may have a flow path 120. Flow path 120 represents a hypothetical path that the battery ejecta and other fluid may take when it transits vent conduit 112. Flow path 120 may have a variety of profiles. In some embodiments, flow path 120 may be designed such that the battery ejecta and other fluid transits vent conduit 112 using the force of gravity. In some embodiments, flow path 120 may be linear and decreasing (i.e. vent port 108 is "higher" than vent outlet 116). In some embodiments, flow path 120 may have multiple different slopes. As a non-limiting example, flow path 120 may have a first section with a greater negative slope and a second section with a smaller negative slope (see, e.g., flow path 120 in FIG. 1). In some embodiments, flow path 120 may be concave. In some embodiments, flow path 120 may be convex. In some embodiments, flow path 120 may be vertical. One of ordinary skill in the art, having reviewed the entirety of this disclosure, would appreciate that a variety of flow path 120 are possible)

With continued reference to FIG. 1, vent outlet 116 is disposed on fuselage 124. Fuselage may be part of an electric aircraft. Vent outlet 116 is configured to allow battery ejecta, or whatever is flowing through vent conduit 112 to exit the aircraft. In some embodiments, vent outlet 116 may be contoured to steer any battery ejecta or other fluid away from the body and/or fuselage 124 of the aircraft. In some embodiments, vent outlet 116 may include fins, aerodynamic or otherwise, adapted to steer any battery ejecta or other fluid away from the body and/or fuselage 124 of the aircraft. Vent outlet 116 may be located in a variety of locations on fuselage 124. In some embodiments, vent outlet 116 may be on the bottom portion of fuselage 124. In some embodiments, vent outlet 116 may be on the side of fuselage 124. In some embodiments, vent outlet 116 may be located on the forward portion of fuselage 124. In some embodiments, vent outlet 116 may be located on the aft portion of fuselage 124.

Figure 2:
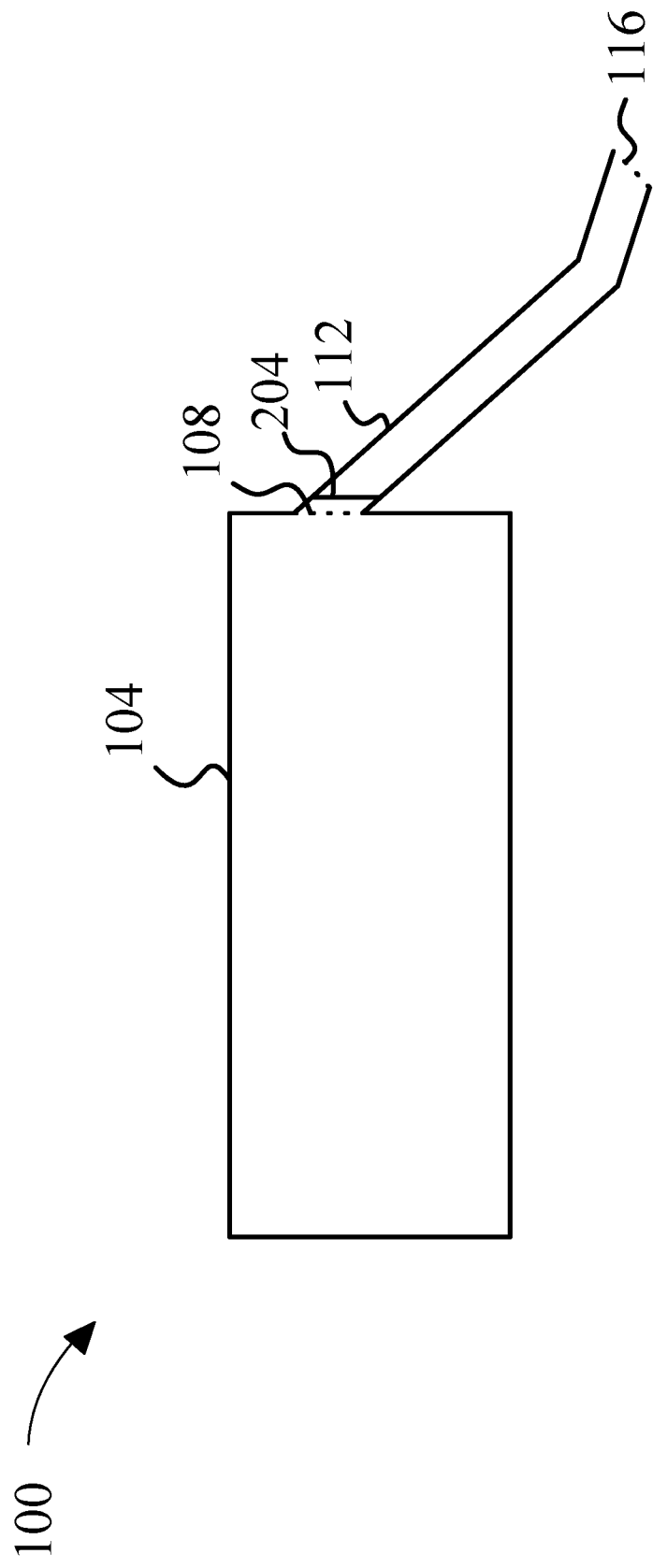
FIG. 2 is another illustration of a battery venting system this time including a pressure disk.

Referring now to FIG. 2, another embodiment of battery venting system 100 is illustrated. Battery venting system 100 includes battery module 104, vent port 108, vent conduit 112, and vent outlet 116, each of which may be implemented, without limitation, as described above in reference to FIG. 1. Battery venting system 100 may include pressure valve 204. For the purposes of this disclosure, a "pressure valve" is a valve that automatically opens when the pressure differential between the two sides of the pressure valve reaches a certain threshold value. Pressure valve 204 may be disposed anywhere within vent conduit 112, including at or near vent port 108 or vent outlet 116. In some embodiments, pressure valve 204 may be a pressure disk. Pressure disk may be a rupture disk, pressure safety disk, burst disk, bursting disc, burst diaphragm, or the like. Pressure disk may have an unruptured and/or intact state and a ruptured state. In its unruptured state, pressure disk may include a membrane that blocks fluid flow through vent conduit 112. Pressure disk may transition to its ruptured state when the pressure differential between the two sides of the membrane becomes too high. In the ruptured state of pressure disk, the membrane may be ruptured. As such, the membrane may no longer block fluid flow. Pressure disk membrane may be made from a variety of materials; the material chosen, and the thickness of the membrane would determine at what pressure differential pressure disk transitions from its unruptured state to its ruptured state. As a non-limiting example, the membrane may include graphite. As another non-limiting example, the membrane may include mica. As another non-limiting example, the membrane may include carbon steel. As another non-limiting example, the membrane may include stainless steel. As another non-limiting example, the membrane may include an alloy. The material must be chosen with reference to the specific performance characteristics desired as well as the specific implementation sought. In some embodiments, vent outlet 116 may include an outlet filter. For the purposes of this disclosure, a "filter" is a porous device that stops objects of a certain size from passing through it. In some embodiments, the outlet filter may occupy the entirety of a cross section of vent outlet 116 such that fluid must flow through it. As a non-limiting example, outlet filter may be a porous object configured to keep unwanted objects such as dirt, rocks, and debris, from entering and/or exiting vent conduit 112.

Referring now to FIG. 3, three exemplary embodiments for a vent conduit cross section, vent conduit cross section 300A, vent conduit cross section 300B, and vent conduit cross section 300C. Vent conduit cross section 300A, vent conduit cross section 300B, and vent conduit cross section 300C may, alternatively, serve as the cross section for vent conduit 112 in FIG. 1 and FIG. 2.

Referring now to FIG. 3A, vent conduit cross section 300A is shown. Vent conduit cross section 300A includes a vent conduit shell 304A. Vent conduit shell 304A may be made from a material that can withstand the heat from battery ejecta. In some embodiments, vent conduit shell 304A may include carbon fiber. For further discussion of the materials of vent conduit shell 304A, see the discussion of materials for vent conduit 112. Vent conduit cross section 300A may also include an ablative layer 308A. Ablative layer 308A may cover the entirety of vent conduit shell 304A, or it may cover only a portion of vent conduit shell 304A. Ablative layer 308A may be consistent with the ablative layer discussed with reference to FIG. 1. Vent conduit cross section 300A includes at least a cooling fin, which may include a first cooling fin 312A and a second cooling fin 316A. First cooling fin 312A and second cooling fin 316A may be connected to vent conduit shell 304A. In some embodiments, first cooling fin 312A and second cooling fin 316A may each be covered in ablative layer 308A or, each of first cooling fin 312A and second cooling fin 316A may be only partially covered by ablative layer 308A. In other embodiments, neither first cooling fin 312A and or second cooling fin 316A may be covered in ablative layer 308A. First cooling fin 312A and second cooling fin 316A may be made of a material with high heat transfer properties. As a non-limiting example, first cooling fin 312A and second cooling fin 316A may include aluminum. As another non-limiting example, first cooling fin 312A and second cooling fin 316A may include copper. In some embodiments, first cooling fin 312A and second cooling fin 316A may include different materials. In some embodiments, first cooling fin 312A and/or second cooling fin 316A may have aerodynamic shapes. For the purposes of this disclosure, an "aerodynamic shape" is a shape designed to reduce drag on fluid moving past it. As a non-limiting example, first cooling fin 312A and/or second cooling fin 316A may have an aerodynamic shape, such as an airfoil, designed to minimize drag as the battery ejecta and other fluids flow over the first cooling fin 312A and second cooling fin 316A. As another non-limiting example, the cross section of first cooling fin 312A and/or second cooling fin 316A may be an airfoil from the NACA four-digit series. As another nonlimiting example, the cross section of first cooling fin 312A and/or second cooling fin 316A may be an airfoil having no camber, such as, as a non-limiting example, a NACA 0015 airfoil. In some embodiments, first cooling fin 312A and/or second cooling fin 316A may be shaped to direct battery ejecta to vent outlet. As a non-limiting example, if the vent conduit has a bend in it, first cooling fin 312A and/or second cooling fin 316A may operate to direct battery ejecta around the bend. In some embodiments, first cooling fin 312A and/or second cooling fin 316A may include surface turbulators. For the purposes of this disclosure, a "surface turbulator" is a turbulator that is attached to the surface of a body. For the purposes of this disclosure, a "turbulator" is a device that turns a laminar boundary layer into a turbulent boundary layer.

With continued reference to FIG. 3A, vent conduit cross section 300A may include a heat sink 320A. Heat sink 320A may be connected to vent conduit shell 304A. Alternatively of additionally, heat sink 320A may be connected to first cooling fin 312A and/or second cooling fin 316A. Heat sink 320A may be made from a material with high heat transfer abilities. As a non-limiting example, heat sink 320A may include aluminum. As another non-limiting example, heat sink 320A may include copper. In some embodiments, heat sink 320A may include heat sink fins. The heat sink fins may be adapted to allow for more of the surface area of heat sink 320A to be exposed to the fluid surrounding vent conduit cross section 300A. This allows the heat sink to dissipate more heat. In some embodiments, heat sink 320A may have a cooling fan 324A attached to it. Cooling fan 324A may be any fan adapted for use with a heat sink. As non-limiting examples, cooling fan 324A may be a turbine, an impeller, an aerator, or the like. Cooling fan 324A may be configured to pull or push air over heat sink 320A or the fins of heat sink 320A in order to increase the convective cooling ability of heat sink 320A.

Referring now to FIG. 3B, vent conduit cross section 300B is shown. Vent conduit cross section 300B may include a vent conduit shell 304B and an ablative layer 308B. Vent conduit shell 304B may be consistent with vent conduit shell 304A in FIG. 3A. Ablative layer 308B may be consistent with ablative layer 308A in FIG. 3A. Vent conduit cross section 300B may also include a turbulator 312B. Turbulator 312B may be disposed inside of vent conduit shell 304B. In some embodiments, turbulator 312B may include at least a ball turbulator. Ball turbulators are small balls that serve to transform laminar flow into turbulent flow. In some embodiments, turbulator 312B may include a spring turbulator. A spring turbulator is a turbulator that is shaped like a metal coil. In some embodiments, turbulator 312B may include a twisted tape turbulator. A twisted tape turbulator is shaped like a helically shaped rod. In some embodiment, turbulator 312B include a matrix turbulator. A matrix turbulator is a rod with wire hooks running down its length.

Referring now to FIG. 3C, vent conduit cross section 300C is shown. Vent conduit cross section 300C may include vent conduit shell 304C and an ablative layer 308C.

Vent conduit shell 304C may be contoured so that it channels liquid on to the portion of the vent conduit shell 304C that is coated in ablative layer 308C. Cooling fin 312C may be consistent with either first cooling fin 312A or second cooling fin 316A in FIG. 3A. In the illustrated exemplary embodiment, only the bottom, trapezoidal portion of vent conduit shell 304C may be covered in an ablative layer 308C; in other embodiments, ablative layer may cover all of vent conduit shell 304C and/or a different portion thereof. Ablative layer may be consistent with ablative layer 308A in FIG. 3A, and or it may be consistent with the ablative layer discussed with reference to FIG. 1. While only one cooling fin 312C is shown in FIG. 3C, a plurality of cooling fins are possible.

Figure 4B:
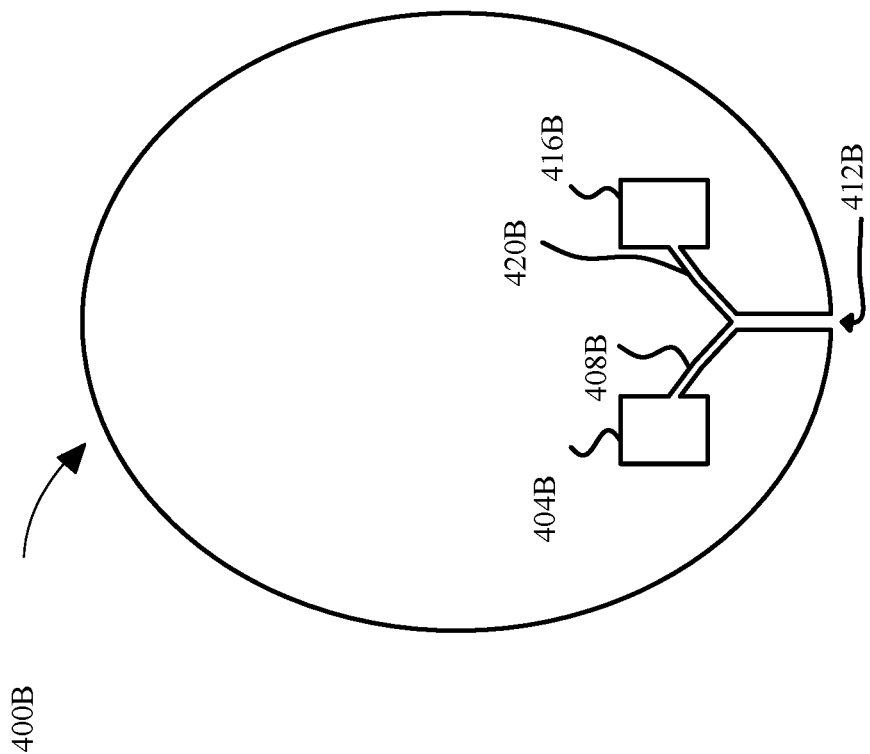
FIG. 4B is a diagram of a battery venting system including multiple battery modules but only one vent outlet.
Figure 4A:
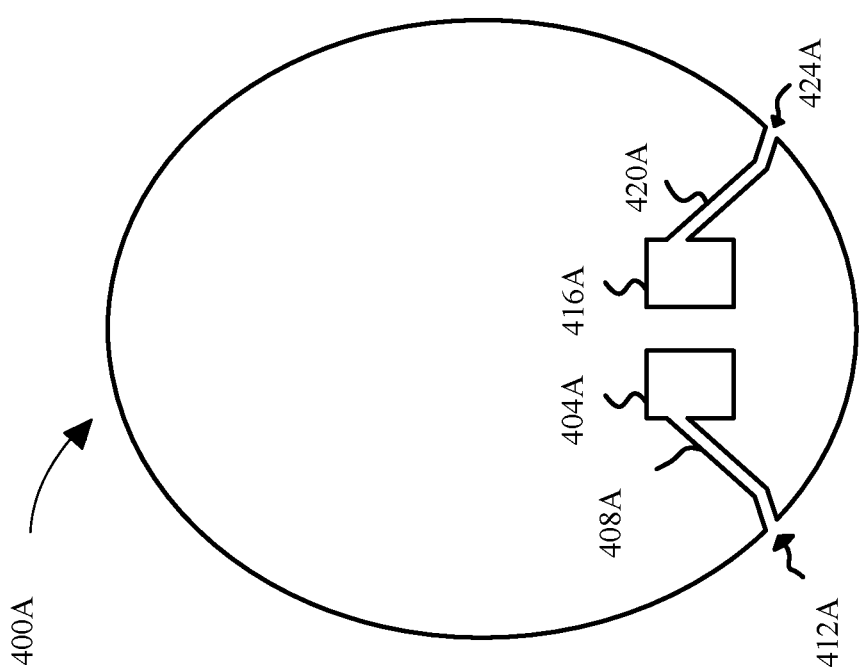
FIG. 4A is a diagram of a battery venting system including multiple battery modules and multiple vent outlets.

Referring now to FIG. 4A, an exemplary embodiment of battery venting system 400A is depicted. Battery venting system 400A may include a first battery module 404A a first vent conduit 408A, and a first vent outlet 412A. Additionally, battery venting system 400A may include a second battery module 416A, a second vent conduit 420A, and a second vent outlet 424A. First battery module 404A, and second battery module 416A may be consistent with any battery module disclosed in this disclosure. First vent conduit 408A and second vent conduit 420A may be consistent with any vent conduit disclosed as part of this disclosure. First vent outlet 412A and second vent outlet 424A may be consistent with any vent outlet disclosed in this disclosure. In FIG. 4A, first battery module 404A is fluidly connected to first vent conduit 408A, which is fluidly connected to first vent outlet 412A. Likewise, second battery module 416A is fluidly connected to second vent conduit 420A, which is fluidly connected to second vent outlet 424A.

Referring now to FIG. 4B, an exemplary embodiment of battery venting system 400B is depicted. Battery venting system 400B is depicted along the longitudinal axis of the aircraft (e.g. aircraft 600 in FIG. 6). Battery venting system 400B may include a first battery module 404B a first vent conduit 408B, and a first vent outlet 412B. Additionally, battery venting system 400B may include a second battery module 416B and a second vent conduit 420B. First battery module 404B and second battery module 416B may be consistent with any battery module disclosed in this disclosure. First vent conduit 408B and second vent conduit 420B may be consistent with any vent conduit disclosed as part of this disclosure. First vent outlet 412B may be consistent with any vent outlet disclosed in this disclosure. Unlike the exemplary embodiment of battery venting system 400A in FIG. 4A, first vent conduit 408B and second vent conduit 420B merge at some point, such that they are each fluidly connected to a single vent outlet, first vent outlet 412B.

Figure 5B:
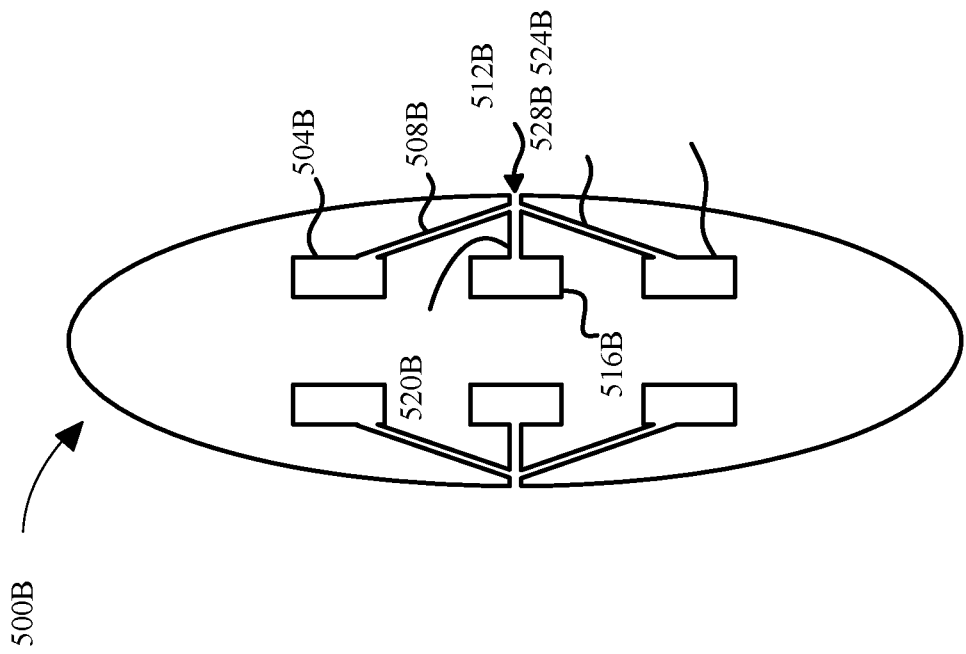
FIG. 5B is an over-head illustration of a battery venting system including multiple battery modules but only one vent outlet.
Figure 5A:
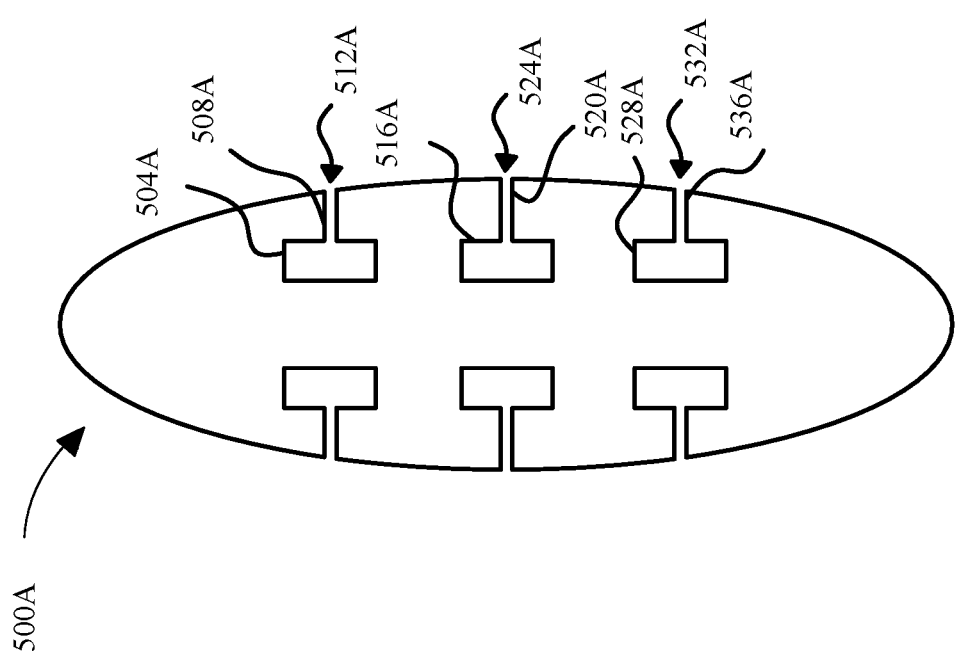
FIG. 5A is an over-head illustration of a battery venting system including multiple battery modules and multiple vent outlets.
Figure 6:
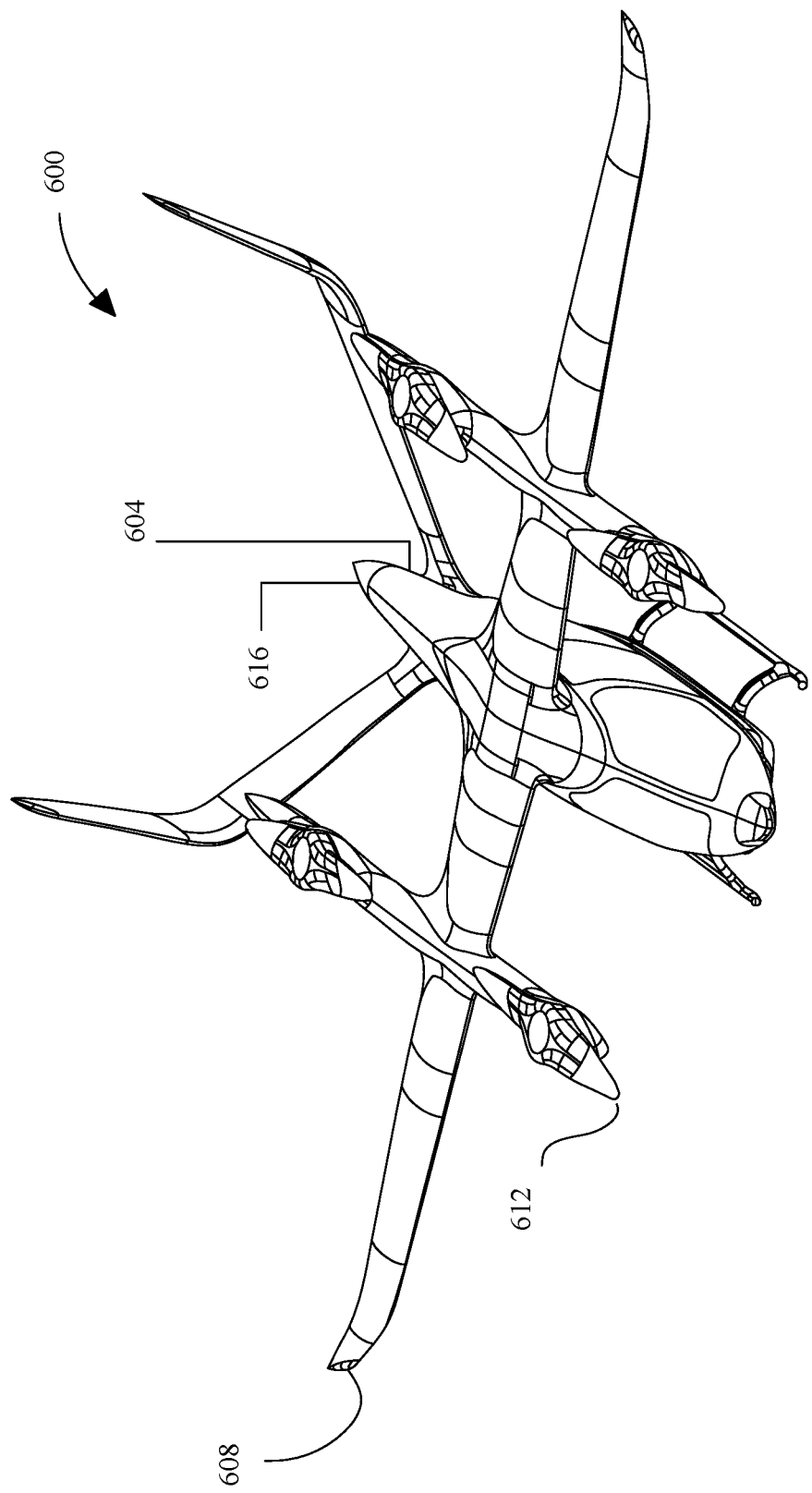
FIG. 6 is an illustration of an exemplary electric vehicle.

Referring now to FIG. 5A, an exemplary embodiment of battery venting system 500A is depicted, shown using a top-down view of the aircraft (e.g. aircraft 600 in FIG. 6). In this figure, for ease of viewing, only one half of battery venting system 500A is labeled. Viewers will understand that this battery venting system 500A is symmetric about the longitudinal axis of the aircraft. Battery venting system 500A may include a first battery module 504A, a first vent conduit 508A, and a first vent outlet 512A. Additionally, battery venting system 500A may include a second battery module 516A, a second vent conduit 520A, and a second vent outlet 524A. Finally, battery venting system 500A may include a third battery module 528A, a third vent conduit 532A, and a third vent outlet 536A. First battery module 504A, second battery module 516A, and third battery module 528A may be consistent with any battery module disclosed as part of this disclosure. First vent conduit 508A, second vent conduit 520A, and third vent conduit 532A may be consistent with any vent conduit disclosed as part of this disclosure. First vent outlet 512A, second vent outlet 524A, and third vent outlet 536A may be consistent with any vent outlet disclosed as part of this disclosure. First battery module 504A is fluidly connected to first vent conduit 508A which is fluidly connected to first vent outlet 512A. Second battery module 516A is fluidly connected to second vent conduit 520A which is fluidly connected to second vent outlet 524A. Third battery module 528 is fluidly connected to third vent conduit 532A which is fluidly connected to third vent outlet 536A.

Referring now to FIG. 5B, an exemplary embodiment of battery venting system 500B is depicted, shown using a top-down view of the aircraft (e.g. aircraft 600 in FIG. 6). In this figure, for ease of viewing, only one half of battery venting system 500B is labeled. Viewers will understand that this battery venting system 500B is symmetric about the longitudinal axis of the aircraft. Battery venting system 500B may include a first battery module 504B a first vent conduit 508B, and a first vent outlet 512B. Additionally, battery venting system 500B may include a second battery module 516B and a second vent conduit 520B. Finally, battery venting system 500B may include a third battery module 524B and a third vent conduit 528B. First battery module 504B, second battery module 516B, and third battery module 524B may be consistent with any battery module disclosed as part of this disclosure. First vent conduit 508B, second vent conduit 520B, and third vent conduit 528B may be consistent with any vent conduit disclosed as part of this disclosure. First vent outlet 512B may be consistent with any vent outlet disclosed as part of this disclosure. First battery module 504B is fluidly connected to first vent conduit 508B. Second battery module 516B is fluidly connected to second vent conduit 520B. Third battery module 524B is fluidly connected to third vent conduit 528B. Unlike the exemplary embodiment of battery venting system 500A in FIG. 5A, first vent conduit 308B, second vent conduit 520B, and third vent conduit 528B merge at some point, such that they are each fluidly connected to a single vent outlet, first vent outlet 512B.

Referring now to FIG. 6, an exemplary embodiment of an electric aircraft 600 is illustrated. Electric aircraft 600 may include an electrically powered aircraft. In some embodiments, electrically powered aircraft may be an electric vertical takeoff and landing (eVTOL) aircraft. Electric aircraft 600 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

In an embodiment, and still referring to FIG. 6, electric aircraft 600 may include a fuselage 604. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 604 may comprise structural elements that physically support the shape and structure of an aircraft.

Structural elements may take a plurality of forms, alone or in combination with other types. Structural elements may vary depending on the construction type of aircraft and specifically, the fuselage. Fuselage 604 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 604 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 604 orthogonal to the longitudinal (nose to tail) axis of the aircraft and forms the general shape of fuselage 604. A former may comprise differing cross-sectional shapes at differing locations along fuselage 604, as the former is the structural element that informs the overall shape of a fuselage 604 curvature. In embodiments, aircraft skin can be anchored to formers and strings such that the outer mold line of the volume encapsulated by the formers and stringers comprises the same shape as electric aircraft when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 6, fuselage 604 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, fuselage 604 may include a semi-monocoque construction. Semi-monocoque construction, as used herein, is a partial monocoque construction, wherein a monocoque construction is describe above detail. In semi-monocoque construction, fuselage 604 may derive some structural support from stressed aircraft skin and some structural support from underlying frame structure made of structural elements. Formers or station frames can be seen running transverse to the long axis of fuselage 604 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 6, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 6, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 604. Monocoque comprises only structural skin, and in that sense, aircraft skin undergoes stress by applied aerodynamic fluids imparted by the fluid. Stress as used in continuum mechanics can be described in pound-force per square inch ($lbf/in^2$) or Pascals (Pa). In semi-monocoque construction stressed skin bears part of the aerodynamic loads and additionally imparts force on the underlying structure of stringers and formers.

Still referring to FIG. 6, it should be noted that an illustrative embodiment is presented only, and this disclosure in no way limits the form or construction of electric aircraft. In embodiments, fuselage 604 may be configurable based on the needs of the electric per specific mission or objective. The general arrangement of components, structural elements, and hardware associated with storing and/or moving a payload may be added or removed from fuselage 604 as needed, whether it is stowed manually, automatedly, or removed by personnel altogether. Fuselage 604 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 604 may also be configurable to accept certain specific cargo containers, or a receptable that can, in turn, accept certain cargo containers.

Still referring to FIG. 6, electric aircraft may include a plurality of laterally extending elements 608 attached to fuselage 604. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry comprises an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. In an embodiment, and without limitation, wing may include a leading edge. As used in this disclosure a "leading edge" is a foremost edge of an airfoil that first intersects with the external medium. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. As used in this disclosure a "trailing edge" is a rear edge of an airfoil. In an embodiment, and without limitation, trailing edge may include an edge capable of controlling the direction of the departing medium from the wing, such that a controlling force is exerted on the aircraft. Laterally extending element 608 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dualmode aircraft may comprise a combination of control surfaces to perform maneuvers while flying or on ground.

Still referring to FIG. 6, electric aircraft may include a plurality of lift components 612 attached to the plurality of laterally extending elements 608. As used in this disclosure a "lift component" is a component and/or device used to propel a craft upward by exerting downward force on a fluid medium, which may include a gaseous medium such as air or a liquid medium such as water. Lift component 612 may include any device or component that consumes electrical power on demand to propel an electric aircraft in a direction or other vehicle while on ground or in-flight. For example, and without limitation, lift component 612 may include a rotor, propeller, paddle wheel, and the like thereof, wherein a rotor is a component that produces torque along a longitudinal axis, and a propeller produces torquer along a vertical axis. In an embodiment, lift component 612 may include a propulsor. In an embodiment, when a propulsor twists and pulls air behind it, it will, at the same time, push an aircraft forward with an equal amount of force. As a further non-limiting example, lift component 612 may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward.

In an embodiment, and still referring to FIG. 6, lift component 612 may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 612 may include a rotating power-driven hub, to which are attached several radial airfoil-section blades such that the whole assembly rotates about a longitudinal axis. The blades may be configured at an angle of attack. In an embodiment, and without limitation, angle of attack may include a fixed angle of attack. As used in this disclosure an "fixed angle of attack" is fixed angle between the chord line of the blade and the relative wind. As used in this disclosure a "fixed angle" is an angle that is secured and/or unmovable from the attachment point. For example, and without limitation fixed angle of attack may be 2.8° as a function of a pitch angle of 8.1° and a relative wind angle 5.4°. In another embodiment, and without limitation, angle of attack may include a variable angle of attack. As used in this disclosure a "variable angle of attack" is a variable and/or moveable angle between the chord line of the blade and the relative wind. As used in this disclosure a "variable angle" is an angle that is moveable from the attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, and still referring to FIG. 6, lift component 612 may be configured to produce a lift. As used in this disclosure a "lift" is a perpendicular force to the oncoming flow direction of fluid surrounding the surface. For example, and without limitation relative air speed may be horizontal to electric aircraft, wherein the lift force may be a force exerted in the vertical direction, directing electric aircraft upwards. In an embodiment, and without limitation, lift component 612 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. In an embodiment, and without limitation, lift component 612 may receive a source of power and/or energy from a power sources may apply a torque on lift component 612 to produce lift. As used in this disclosure a "power source" is a source that that drives and/or controls any component attached to electric aircraft. For example, and without limitation power source may include a motor that operates to move one or more lift components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 6, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which electric aircraft may be incorporated.

In an embodiment, and still referring to FIG. 6, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 6, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/948,140 both entitled "SYSTEM AND METHOD FOR HIGH ENERGY DENSITY BATTERY MODULE" by S. Donovan et al., which are incorporated in their entirety herein by reference.

Still referring to FIG. 6, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 6, another exemplary flight component may include landing gear. Landing gear may be used for take-off and/or landing. Landing gear may be used to contact ground while aircraft is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 6, aircraft may include a pilot control, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of lift components. For example and without limitation, collective control may alter and/or adjust the pitch angle of all of the main rotor blades collectively. For example, and without limitation pilot control may include a yoke control. As used in this disclosure a "yoke control" is a mechanical control of an aircraft to control the pitch and/or roll. For example and without limitation, yoke control may alter and/or adjust the roll angle of electric aircraft as a function of controlling and/or maneuvering ailerons. In an embodiment, pilot control may include one or more foot-brakes, control sticks, pedals, throttle levels, and the like thereof. In another embodiment, and without limitation, pilot control may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 6, pilot control may be configured to modify a variable pitch angle. For example, and without limitation, pilot control may adjust one or more angles of attack of a propeller. As used in this disclosure an "angle of attack" is an angle between the chord of the propeller and the relative wind. For example, and without limitation angle of attack may include a propeller blade angled 4.2°. In an embodiment, pilot control may modify the variable pitch angle from a first angle of 2.71° to a second angle of 4.82°. Additionally or alternatively, pilot control may be configured to translate a pilot desired torque. For example, and without limitation, pilot control may translate that a pilot's desired torque for a propeller be 160 lb. ft. of torque. As a further non-limiting example, pilot control may introduce a pilot's desired torque for a propulsor to be 290 lb. ft. of torque. Additional disclosure related to pilot control may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 6, aircraft 600 may include a loading system. A loading system may include a system configured to load an aircraft of either cargo or personnel. For instance, some exemplary loading systems may include a swing nose, which is configured to swing the nose of aircraft of the way thereby allowing direct access to a cargo bay located behind the nose. A notable exemplary swing nose aircraft is Boeing 747. Additional disclosure related to loading systems can be found in U.S. patent application Ser. No. 17/147,594 entitled "SYSTEM AND METHOD FOR LOADING AND SECURING PAYLOAD IN AN AIRCRAFT" by R. Griffin et al., entirety of which in incorporated herein by reference.

Still referring to FIG. 6, aircraft 600 may include a sensor. Sensor may be configured to sense a characteristic of pilot control. Sensor may be a device, module, and/or subsystem, utilizing any hardware, software, and/or any combination thereof to sense a characteristic and/or changes thereof, in an instant environment, for instance without limitation a pilot control, which the sensor is proximal to or otherwise in a sensed communication with, and transmit information associated with the characteristic, for instance without limitation digitized data. Sensor may be mechanically and/or communicatively coupled to aircraft 600, including, for instance, to at least a pilot control. Sensor may be configured to sense a characteristic associated with at least a pilot control. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor may include at least a geospatial sensor. Sensor may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft for both critical and non-critical functions. Sensor may be incorporated into vehicle or aircraft or be remote.

Still referring to FIG. 6, in some embodiments, sensor may be configured to sense a characteristic associated with any pilot control described in this disclosure. Non-limiting examples of a sensor may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor may sense a characteristic as an analog measurement, for instance, yielding a continuously variable electrical potential indicative of the sensed characteristic. In these cases, sensor may additionally comprise an analog to digital converter (ADC) as well as any additionally circuitry, such as without limitation a Whetstone bridge, an amplifier, a filter, and the like. For instance, in some cases, sensor may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within X, for instance without limitation a computing system, a pilot display, and a memory component. Alternatively or additionally, sensor may sense a characteristic of a pilot control digitally. For instance in some embodiments, sensor may sense a characteristic through a digital means or digitize a sensed signal natively. In some cases, for example, sensor may include a rotational encoder and be configured to sense a rotational position of a pilot control; in this case, the rotational encoder digitally may sense rotational "clicks" by any known method, such as without limitation magnetically, optically, and the like.

Still referring to FIG. 6, aircraft 600 may include at least a motor, which may be mounted on a structural feature of the aircraft. Design of motor may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor may include two main holes in top and bottom of mounting area to access bearing cartridge. Further, a structural feature may include a component of electric aircraft 600. For example, and without limitation structural feature may be any portion of a vehicle incorporating motor, including any vehicle as described in this disclosure. As a further non-limiting example, a structural feature may include without limitation a wing, a spar, an outrigger, a fuselage, or any portion thereof persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least lift component. Persons skilled in the art, upon reviewing the entirety of this disclosure, will be aware of various materials, combinations of materials, and/or constructions techniques.

Still referring to FIG. 6, electric aircraft 600 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 6, a number of aerodynamic forces may act upon the electric aircraft during flight. Forces acting on electric aircraft 600 during flight may include, without limitation, thrust, the forward force produced by the rotating element of the electric aircraft and acts parallel to the longitudinal axis. Another force acting upon electric aircraft 600 may be, without limitation, drag, which may be defined as a rearward retarding force which is caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 600 are designed to be as lightweight as possible. Reducing the weight of the aircraft and designing to reduce the number of components is essential to optimize the weight. To save energy, it may be useful to reduce weight of components of electric aircraft 600, including without limitation propulsors and/or propulsion assemblies. In an embodiment, motor may eliminate need for many external structural features that otherwise might be needed to join one component to another component. Motor may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

Still referring to FIG. 6, electric aircraft may include at least a longitudinal thrust component 616. As used in this disclosure a "longitudinal thrust component" is a flight component that is mounted such that the component thrusts the flight component through a medium. As a non-limiting example, longitudinal thrust flight component 616 may include a pusher flight component such as a pusher propeller, a pusher motor, a pusher propulsor, and the like. Additionally, or alternatively, pusher flight component may include a plurality of pusher flight components. As a further non-limiting example, longitudinal thrust flight component may include a puller flight component such as a puller propeller, a puller motor, a puller propulsor, and the like. Additionally, or alternatively, puller flight component may include a plurality of puller flight components.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A battery venting system, comprising:
   at least a battery module, the at least a battery module containing a plurality of battery cells, the at least a battery module comprising a vent port;
   at least a vent outlet, the at least a vent outlet disposed on a surface of an aircraft fuselage;
   at least a vent conduit, the at least a vent conduit fluidly connecting the vent port of the battery module to the at least a vent outlet, the at least a vent conduit configured to carry material, from the battery to the at least a vent outlet, the at least a vent conduit comprising:
   at least a cooling fin, the at least a cooling fin disposed on an interior wall of the at least a vent conduit and extending into the at least a vent conduit, the at least a cooling fin configured to dissipate heat from the battery ejecta when the battery ejecta is in the at least a vent conduit; and
   a matrix turbulator.

2. The battery venting system of claim 1, wherein the at least a cooling fin includes a plurality of cooling fins.

3. The battery venting system of claim 2, wherein the plurality of cooling fins are comprised of carbon fiber.

4. The battery venting system of claim 1, wherein the at least a cooling fin is configured to direct battery ejecta towards the at least a vent outlet.

5. The battery venting system of claim 1, wherein the at least a vent outlet is comprised of carbon fiber.

6. The battery venting system of claim 1, wherein the at least a vent conduit comprises:
   a heat sink, wherein the heatsink is in thermal communication with the at least a cooling fin; and a cooling fan, the cooling fan attached to the heat sink and configured to dissipate heat from the heat sink using convection.

7. The battery venting system of claim 1, wherein the at least a vent conduit further comprises a pressure valve.

8. The battery venting system of claim 7, wherein the pressure valve is a pressure disk, the pressure disk having an intact state and a ruptured state, wherein: when the pressure disk is in its intact state, the pressure disk stops battery ejecta from venting; and when the pressure disk is in its ruptured state, the pressure disk allows battery ejecta to vent.

9. The battery venting system of claim 1, wherein the at least a vent conduit comprises an ablative layer, the ablative layer disposed on at least a portion of the interior wall of the at least a vent conduit, the ablative layer having a spent state wherein it is no longer disposed on the interior wall of the at least a vent conduit and may be carried by the at least a vent conduit to the at least a vent outlet.

10. The battery venting system of claim 9, wherein the ablative layer is disposed on the entirety of the interior wall of the at least a vent conduit.

11. The battery venting system of claim 9, wherein the interior wall of the at least a vent conduit is contoured to channel the battery ejecta onto at least a portion of the interior wall of the at least a vent conduit on which the ablative layer is disposed.

12. The battery venting system of claim 1, wherein the at least a vent conduit is comprised of carbon fiber.

13. The battery venting system of claim 1, wherein the at least a vent outlet is configured to direct battery ejecta away from an exterior of the aircraft fuselage.

14. The battery venting system of claim 1, wherein:
   the at least a battery module comprises a plurality of battery modules;
   the at least a vent conduit comprises a plurality of vent conduits; and
   each of the plurality of vent conduits connecting the vent port on a battery module of the plurality of battery modules to the vent outlet.

15. The battery venting system of claim 1, wherein:
   the at least a battery module comprises a plurality of battery modules;
   the at least a vent conduit comprises a plurality of vent conduits;
   the at least a vent outlet comprises a plurality of vent outlets; and
   each of the plurality of vent conduits connecting the vent port on a battery module of the plurality of battery modules to a vent outlet of the plurality of vent outlets.

16. The battery venting system of claim 1, wherein the at least a vent outlet is disposed on a bottom surface of the aircraft fuselage.

17. The battery venting system of claim 1, wherein the at least a vent outlet comprises an outlet filter.

* * * * *